(12) United States Patent
Miles

(10) Patent No.: US 7,835,106 B2
(45) Date of Patent: Nov. 16, 2010

(54) METHOD OF CONTROLLING THE POSITION OF A READ/WRITE HEAD AND APPARATUS FOR TESTING A READ/WRITE HEAD

(75) Inventor: Michael Alan Miles, Rowlands Castle (GB)

(73) Assignee: Xyratex Technology Limited, Havant (GB)

( * ) Notice: Subject to any disclaimer, the term of this patent is extended or adjusted under 35 U.S.C. 154(b) by 19 days.

(21) Appl. No.: 12/306,357

(22) PCT Filed: Jun. 25, 2007

(86) PCT No.: PCT/GB2007/002369

§ 371 (c)(1),
(2), (4) Date: Feb. 24, 2009

(87) PCT Pub. No.: WO2008/001062

PCT Pub. Date: Jan. 3, 2008

(65) Prior Publication Data

US 2009/0310245 A1 Dec. 17, 2009

Related U.S. Application Data

(60) Provisional application No. 60/817,084, filed on Jun. 29, 2006.

(51) Int. Cl.
*G11B 21/02* (2006.01)

(52) U.S. Cl. .................. 360/75; 360/6; 360/31; 360/77.03

(58) Field of Classification Search ........................ None
See application file for complete search history.

(56) References Cited

U.S. PATENT DOCUMENTS

| 5,828,514 A * | 10/1998 | Chliwnyj et al. | 360/77.12 |
| 6,023,145 A | 2/2000 | Karaaslan et al. | |
| 6,219,193 B1 | 4/2001 | Janz | |
| 6,538,838 B1 | 3/2003 | Sacks et al. | |
| 6,600,622 B1 * | 7/2003 | Smith | 360/77.06 |
| 7,012,777 B1 * | 3/2006 | Hirano et al. | 360/77.03 |
| 2001/0033452 A1 | 10/2001 | Koganezawa et al. | |

FOREIGN PATENT DOCUMENTS

WO    WO 01/31643 A    5/2001

* cited by examiner

*Primary Examiner*—Jason C Olson
(74) *Attorney, Agent, or Firm*—Pillsbury Winthrop Shaw Pittman LLP

(57) ABSTRACT

A method of controlling the position of a read/write head relative to a disk in a test apparatus is disclosed. The test apparatus has a positioner for positioning the head. The positioner has a sensor to measure the actual position achieved by the positioner. The method includes generating a sensor signal measuring the actual position achieved by the positioner; generating a position error signal of the head relative to the disk detected at the head; high pass filtering the head position error signal and low pass filtering the sensor signal so that there is substantially no overlap in frequency between them; and, deriving a low frequency head error signal from the head position error signal corresponding to any drift of the head.

16 Claims, 14 Drawing Sheets

- ⋯XXX⋯  Servo Read Between Sectors
- ⊖⊖⊖  Read Sectors
- ⋯⋯⋯⋯  Track Dead Center
- ⋯⋯▫⋯  Thermal Drift Before Compensation (Exaggerated)
- – – – –  Threshold of Useful Data

| | |
|---|---|
| ---XXX--- | Servo Read Between Sectors |
| -OOO- | Read Sectors |
| ............ | Track Dead Center |
| ........☐... | Thermal Drift Before Compensation (Exaggerated) |
| - - - - - | Threshold of Useful Data |

| | |
|---|---|
| ⋯XXX⋯ | Servo Read Between Sectors |
| -OOO- | Read Sectors |
| ⋯⋯⋯⋯ | Track Dead Center |
| ⋯⋯⊓⋯ | Thermal Drift Before Compensation (Exaggerated) |
| - - - - - | Threshold of Useful Data |

METHOD OF CONTROLLING THE POSITION OF A READ/WRITE HEAD AND APPARATUS FOR TESTING A READ/WRITE HEAD

CROSS REFERENCE TO RELATED APPLICATIONS

This is the U.S. National Phase of PCT/GB2007/002369, filed Jun. 25, 2007, which claims priority to U.S. Application No. 60/817,084, filed Jun. 29, 2006, the entire contents of all of which are incorporated herein by reference.

The present invention relates to a method of controlling the position of a read/write head and to apparatus for testing a read/write head.

In embodiments, the present invention relates generally to magnetic head testers such as are commonly known as "spin-stands" in the art.

Spin stands were first developed in the art as a tool for use during research and development to allow the performance of the various components of disk drives, for example the heads, disks and channels, to be evaluated and optimised. It is now common to also use spin stands in the field of disk drive manufacturing to test each manufactured read/write head or disk before it is assembled into a disk drive unit.

A typical test apparatus known in the art comprises a motor driven spindle on which a disk is mounted that can be written to and read by the head under test, and a support assembly for supporting the head under test and "flying" the head over the disk when spun. The test apparatus also comprises means to allow the head to be positioned over the disk. This typically comprises a coarse positioning device, such as an X-Y positioning stage, for positioning the head anywhere over the surface of the disk. The coarse positioning device is used to position the head approximately in the region of a test track on the disk. A fine positioning device, such as a piezo-element actuator or similar nanopositioner, is typically also provided for fine positioning of the head. The fine positioning device is used to find and locate the head over the centre of the track and then to "micro-jog" the head over small increments from the track centre.

When conducting a test, the head is first positioned over the centre of the track, and the fine positioning device is then used to position the head at various radial positions on or close to the track. Test data is written to the track and subsequently read back by the head at the various radial offsets of the head. Typically readings must be taken over several revolutions of the disk at each offset to reject noise. In this way a series of tests may be conducted, including for example so-called bit error rate (BER) bathtubs, track squeeze, track centre, read/write offset, etc. For example, bit error rate (BER) bathtub tests consist of determining the BER in reading data from the track at various radial offsets of the head relative to the track centreline (TCL). A graph is then plotted of BER against offset. Examples of bathtubs are shown in FIG. 1.

In some commonly employed testing techniques, the fine positioning device has a highly accurate internal sensor for determining the actual position achieved by the fine positioning device. This position term is generally highly accurate (of the order of nanometres or less). The position term can be fed back in a negative feedback loop in order to generate a positioner error term, i.e. the difference between the desired position of the head that is input to the positioning system (the so-called "commanded position") and the actual position achieved by the fine positioning device. This positioner error term is generally also highly accurate and is fed back into a servo controller for the fine positioning device and which is arranged to reduce or eliminate any error and achieve a more accurate positioning. However, despite the fine positioning device having this feedback control, there is no way of the system determining any error that has been introduced between the commanded head offset and the actual head offset relative to a position on the disk due to sources of error that cannot be "seen" by the sensor of the fine positioner. This means that the positioning of the head at the various offsets relative to the track centre is still to a large extent open loop.

In practice, this is undesirable, as noise from various sources and particularly from thermal drift and vibrational modes of the disk and/or spindle can affect the system and lead to error in both achieving the desired offset and maintaining the desired offset. FIG. 1A shows how the actual offset can vary from the commanded offset in practice. FIGS. 1B and 1C show the effect that such noise can have when producing a bathtub curve in distorting the bathtub curve. This distortion may lead to costly mischaracterisation of heads, leading to "good" heads being rejected and therefore wasted, or "bad" heads passing testing such that their defects are only detected later, such as when they are tested as part of a head disk assembly.

Thermal drift is a particular problem in head testing apparatus. Thermal drift is caused by components having different thermal properties or being in closer proximity to a heat source than other components, causing the components to expand at different rates and move in relation to each other. In a head test apparatus, this may cause the head and the disk to drift in position relative to each other over time. In typical prior art test apparatus, as a result of thermal drift, the test reading procedure must be frequently interrupted while the head is repositioned over the track centreline, the absolute position of which relative to the disk can be found with relative certainty thus allowing it to act as an absolute reference, and the desired offset relative to the track centreline is re-established. This is undesirably time consuming and thus costly.

In addition, since the general trend in disk drive technology is for the widths of the heads and tracks to decrease, the above mentioned problems caused by thermal drift and other sources of error are thus exacerbated as this trend continues. Standard techniques are becoming increasingly inadequate.

In order to address some of these problems, it has been suggested in the prior art to use servo tracks on the disk to allow the absolute position of the head relative to the disk to be determined. Under this scheme, the test track comprises two types of data. The first set of data is in the form of servo bursts, which are generally arranged in the form of a sectored servo track. The second set of data is the test data, which is written interleaved with the servo bursts of the sectored servo track. This data is written anew and read back by each head tested in the apparatus to allow the read/write performance of the individual head to be measured.

The servo bursts in effect define the position of the test track on the disk and are used by the head to establish its position relative to the track in terms of a position error signal (PES), as is generally known in the art. The PES derived from the servo bursts is ultimately fed back to a servo controller and used in reducing any error in the commanded position of the head. Thus the PES gives a direct measure of the absolute position of the head relative to the disk and can therefore be used in compensating for thermal drift or vibrational modes in the spindle or disk or other sources of error that cannot be detected by the sensor of the fine positioner. However, the PES is not as accurate as the position measured by the sensor of the fine positioner, suffers more from noise and has less resolution.

This technique of reading and demodulating servo bursts to provide a head position error signal is broadly similar to how the servo system operates in a head disk assembly in end use. However this technique is less suited for use in a head test apparatus because of the non-linear response of each individual head to the servo bursts. In a test apparatus, as described above, it is desired to achieve various offsets relative to the track centreline and to maintain these offsets for several revolutions of the disk. This creates a problem when using servo bursts as the source of error used in the controller, as the PES sample derived from the servo burst is generally non-linear away from the track centre line, and hence does not give a dependable measure of the position of the head away from the track centre line. Also, successive heads under test are likely to have some variation in their width, leading to variation in the gain of the PES read from the servo bursts. These factors negatively affect the stability and performance of the controller in positioning the head.

To overcome the effects of possible non-linearity and variation of gain of the PES, the prior art has suggested to "characterise" each head to the servo track to compensate for these sources of inaccuracy, allowing a more accurate error term to be generated from the PES for measuring the deviation of the head from its commanded position. However, such characterisation requires a significant time to perform. The overhead in time may be tolerable in test apparatus in a research and development environment. However, the overhead in time makes this technique prohibitive in a disk drive manufacturing environment. As a result, in practice, this technique is not used in a manufacturing environment.

For example, U.S. Pat. No. 6,538,838 teaches a spinstand where prior to conducting read/write of test data, the head is first characterised to the servo track in order to compensate for possible variation in the widths between different heads. The head is stepped across the servo track in order to build up a look-up table of PES values for different head offsets. This table is used during testing to enable the system to determine the "true" position of the head on the track for the PES actually read by the head. During testing the true value of PES is fed back to a controller to reduce error in the position of the head. However, this technique requires a significant time overhead in characterising the head to the track, which makes this technique unattractive in a production environment.

U.S. Pat. No. 6,023,145 teaches a slightly different system from that of U.S. Pat. No. 6,538,838, where feedback from the error signal of the micro positioner and from the PES measured by the head is used in a control system to reduce error and to eliminate the effects of thermal drift. During testing, a micro positioner is used to step the head at various offsets across a track. At each new offset of the head on the track, before test data is written/read, the head first reads values of PES derived from the servo bursts at that radial location and stores these values in memory to obtain a "reference point" of the PES at that offset. On subsequent revolutions of the disk, while the head is at that particular offset, each PES sample read by the head on that revolution is compared to the corresponding value stored in memory in order to detect any error due to thermal drift. The error term is fed back to a feedback controller in order to compensate for thermal drift. Thus at each new offset of the head, the feedback of the PES signal must be suspended whilst the head is re-calibrated to the servo track in order to obtain a new reference point for the calculation of a thermal drift error term, before test data can be written/read again. Again this introduces an overhead in time taken for testing a head that makes this technique unsuitable for a manufacturing environment, where high throughput of tested units is desirable to reduce costs.

The servo schemes as suggested in the prior art also fail to provide a controller that fully utilises the benefits that are available using both the feedback from the disk and from the internal sensor of the fine positioning device. U.S. Pat. No. 6,538,838 for instance does not use feedback from the internal sensor of the fine positioning device in tracking the commanded position, and thus does not benefit from the accuracy that the internal sensor can achieve. U.S. Pat. No. 6,023,145 for instance uses a correction for low frequency thermal drift between the disk and head but ignores the problem of the high frequency vibration of the spindle which is another significant source of error.

According to a first aspect of the present invention, there is provided a method of controlling the position of a read/write head relative to a disk in a test apparatus, the test apparatus having a positioner for positioning the head, the positioner having a sensor for measuring the actual position achieved by the positioner, the method comprising: generating a sensor signal measuring the actual position achieved by the positioner; generating a position error signal of the head relative to the disk detected at the head; high pass filtering the head position error signal and low pass filtering the sensor signal so that there is substantially no overlap in frequency between them; deriving a low frequency head error signal from the head position error signal corresponding to any drift of the head; feeding forward the low frequency head error signal to generate a compensated commanded position of the head; generating a position error signal of the positioner in accordance with the compensated commanded position of the head and the filtered sensor signal; providing both said positioner error signal and said high frequency head error signal to a hybrid servo controller; and, controlling the position of the head by causing said hybrid servo controller to signal said positioner with a movement control signal generated in accordance with both of said provided error signals used simultaneously.

This has the advantage that the highly accurate signal from the sensor of the positioner can be used to reduce head position error, and in addition the head error signal, which is preferably a PES demodulated from servo bursts on the disk, can be simultaneously used to reduce errors that the positioner does not detect, such as for example errors caused by thermal drift and disk vibration modes. In particular, the high frequency head error signal can be used by the controller to reject errors in the head position caused by high frequency vibrations in the disk or spindle or other parts of the test apparatus. By appropriately filtering the signals, conflict between the positioner error signal and the high frequency head signal is avoided in the controller. This arrangement also has the advantage that calibration of the head to the servo track before or during testing is generally not necessary. A low frequency head error signal is generated corresponding to the thermal drift experienced by the head. This error term is fed forward to the controller to generate a compensated command position signal in order to compensate for any such thermal drift. Again, this feedforward arrangement precludes possible conflict in the controller. Preferably, the low frequency head error signal is generated such that calibration to the servo bursts on the disk to compensate for non-linearity in the PES is unnecessary. This advantageously reduces the time taken for a head to be tested by the apparatus. This also allows compensation for thermal drift to be achieved in real time so as to enable the head to be commanded to different radial positions, for example on a predetermined trajectory, whilst thermal compensation is maintained. Preferably, the low frequency head error signal is low pass filtered and/or integrated before being fed forward to the controller.

The preferred controller therefore achieves high positioning accuracy and good disturbance rejection by using the measured variables, i.e. the positioner sensor signal and the head (PES) signal, in a way that more effectively utilises the particular properties and characteristics of each signal. Conflict in the controller is avoided. Lengthy calibration of the head to the servo bursts before testing begins may be avoided.

Preferably, high pass filtering the head position error signal comprises passing frequency components corresponding to vibration modes of at least one of the disk, or a spindle to which the disk is attached, or other apparatus used to carry out the method. This has the advantage of utilising the high frequency components of the PES, corresponding to disk/spindle vibrational modes, in order to compensate for errors introduced by these effects.

In a preferred embodiment, the disk has at least one track associated therewith having a plurality of servo bursts defining a plurality of servo nulls for the track, the servo nulls being positioned such that there are servo nulls at more than four different radial positions relative to the track, the servo nulls defining a predetermined locus having a known position relationship with the track, the locus extending across the radial extent of the track, the method comprising: (a) determining a target null position on the null locus corresponding to said desired radial position of the head relative to the track in accordance with said known position relationship; (b) detecting the position of at least one servo null with the head; (c) determining from said at least one detected servo null position the position error of the head relative to the target null position; and, (d) generating a position error signal for the head in accordance with said position error. This has the advantage of allowing a PES to be generated that be used for thermal drift compensation without calibration of the head to the servo track being necessary beforehand, thereby allowing testing time to be reduced for each head. This is discussed more fully in our commonly assigned U.S. patent application No. 60/771,879 entitled "METHOD OF GENERATING A POSITION ERROR SIGNAL, METHOD OF WRITING A DATA TRACK, AND APPARATUS FOR TESTING A HEAD AND A DISK" filed on Feb. 10, 2006 and international patent application number PCT/GB2007/000402, the entire contents of which are hereby incorporated by reference, and which are discussed more fully below.

In a preferred embodiment, the method comprises commanding the position of the head with a periodic movement signal such that the radial position of the head moves notionally along a periodic path, the head traversing n wavelengths of the periodic path as a said disk rotates m revolutions, where n and m are integers. Preferably, the commanded periodic path is substantially a sinusoidal path. A periodic movement signal has the advantage that the head is able to read data from the track at various radial positions in a single pass (a pass being defined as an operation where test data is acquired by the read/write head continuously without stopping to reposition the head at a different offset). In comparison, in the prior art arrangements, multiple passes are needed, one pass being needed for each radial offset position of the head. The arrangement of this embodiment has the advantage that less time is spent positioning the head at desired offsets of the disk and more time can be spent actually acquiring test data.

Preferably, the disk has at least one track having servo bursts associated therewith from which the head error position signal is generated, the step of deriving a low frequency head error signal from the head position error signal comprising: sampling the head position error signal at positions of said periodic movement signal that correspond to the track centre points; and, determining the trend in the samples over a plurality of samples to find a drift error term for the head. This is allows a low frequency signal to be derived from the measured PES signal representing the thermal drift of the head. Alternatively, the step of deriving a low frequency head error signal from the head position error signal may comprise low pass filtering the head position error signal. In any case, preferably the low frequency head error signal is derived such that it has an upper frequency of less than 10 Hz.

According to a second aspect of the present invention, there is provided an apparatus for testing a read/write head, the apparatus comprising: a positioner for positioning a read/write head over a radial position on a disk and having a sensor for measuring the actual position achieved by the positioner; a demodulator for demodulating servo bursts read by the head to produce a head position error signal; a low pass filter for filtering the sensor signal and a high pass filter for filtering the head position error signal such that there is substantially no overlap in frequency between the filtered signals; a head error signal filter for deriving a low frequency head error signal from the head position error signal corresponding to any drift of the head; a first summing node for receiving a commanded head position input signal and the low frequency head error signal to generate a compensated commanded position of the head; a second summing node for generating a position error signal of the positioner in accordance with the compensated commanded position of the head and the filtered sensor signal; and, a hybrid servo controller constructed and arranged to control the position of the head with the positioner in accordance with both received error signals used simultaneously.

Embodiments of the present invention will now be described by way of example with reference to the accompanying drawings, in which.

Figure 1A:
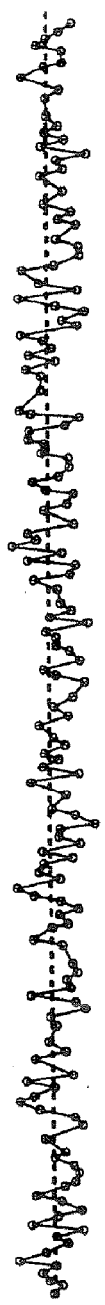
FIG. 1A shows a typical error trajectory of a read/write head at a commanded offset.
Figure 1B:
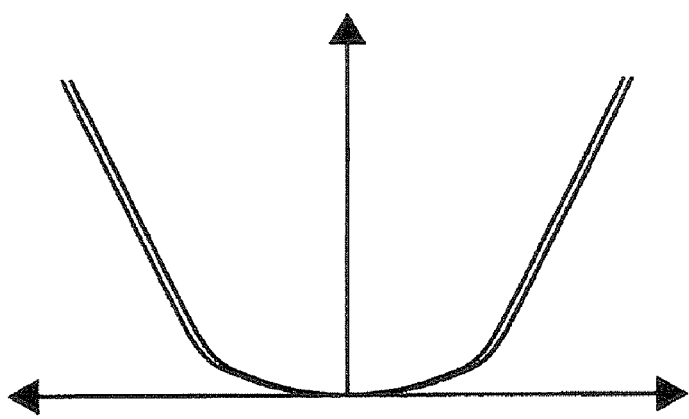
FIGS. 1B,1C show examples of the BER "bathtub" curves, with FIG. 1B showing a bathtub with low noise and FIG. 1C showing a bathtub with high noise.
Figure 1C:
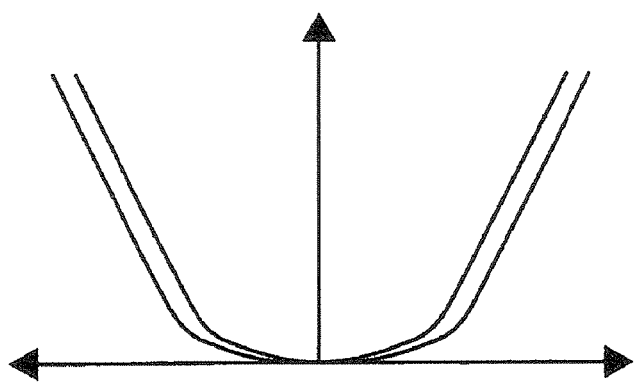
Figure 2:
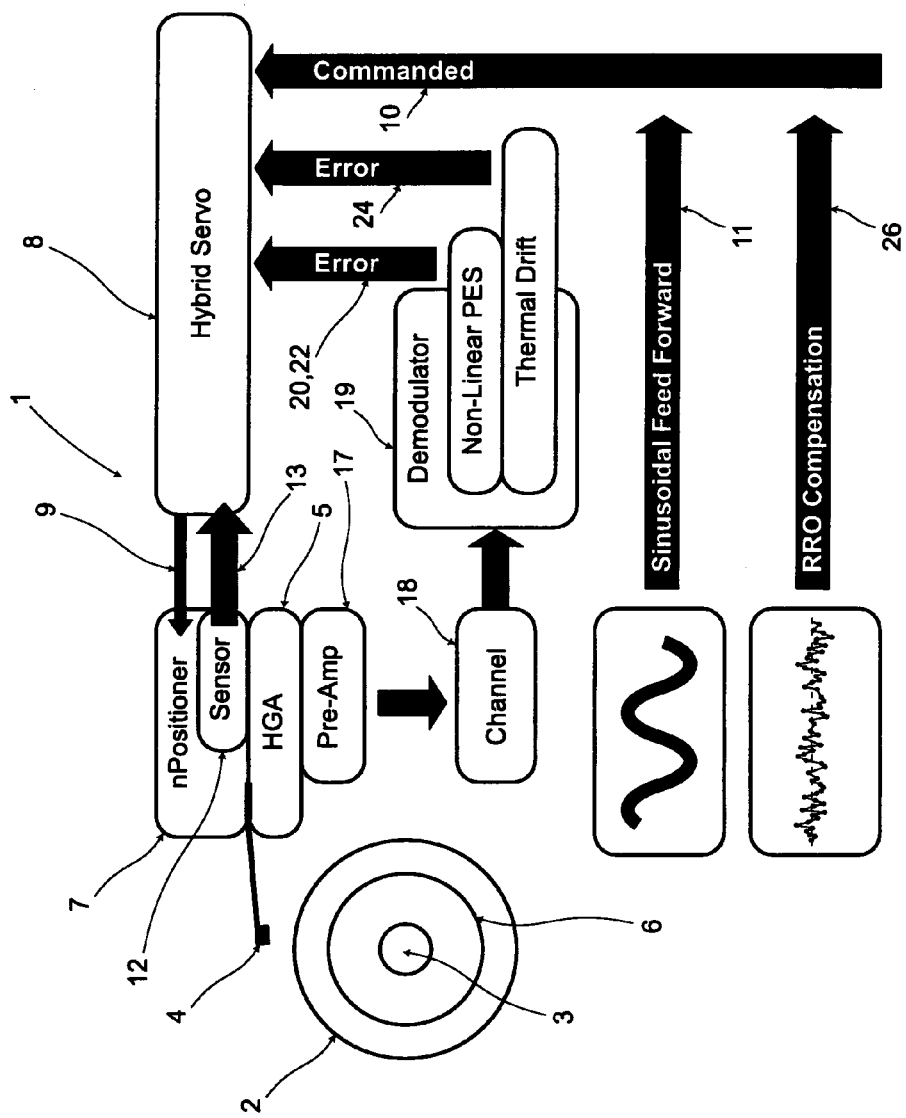
FIG. 2 shows a block diagram of an example of a read/write head test apparatus according to an embodiment of the present invention.

FIG. 2 shows an example of a read/write head test apparatus 1 in accordance with an embodiment of the present invention. A magnetic disk 2 is mounted to a spindle 3. The disk surface has servo bursts written to servo sectors on the surface of the disk 2. The servo bursts may be of any type employed in disk drive units to allow the position of the head to be known. For example, the servo bursts may be commonly known amplitude modulated bursts, quadrature amplitude modulated bursts or phase modulated bursts. Preferably the servo tracks are written to the disk 2 before the head 4 under test is mounted to the apparatus 1. However, alternatively, the head 4 under test itself can be used to write the servo tracks.

A head gimbal assembly 5, comprising the read/write head 4 to be tested, is mounted on a nanopositioner 7. Other forms of actuator other than a nanopositioner can be used, but it is preferred that a single axis micro actuator is used. However, in other embodiments the actuator can be in any suitable form having any number of linear or rotational axes. The nanopositioner 7 is operable to make fine positional adjustments to the head 4 relative to the disk 2.

The nanopositioner 7 is operable to position the head 4 in response to an actuating signal 9 generated by a servo controller 8 by which the nanopositioner 7 is servo controllable. The servo controller 8 has as its input a command signal 10. The servo controller 8 is generally arranged to control the position of the head 4 in accordance with the command signal 10, whether the command signal 10 is an absolute position, a move to a new absolute position or a trajectory. The servo controller 8 preferably has a hybrid servo architecture as will be described further in the following.

Figure 4A:
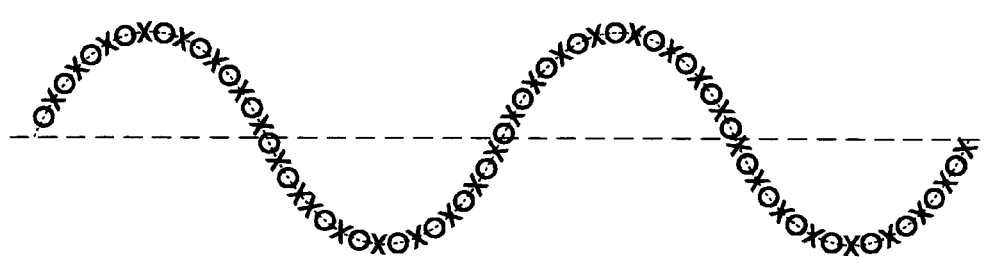
FIG. 4A shows an example of an idealised sinusoidal commanded head trajectory suitable for use with the test apparatus of FIG. 2.
Figure 4B:
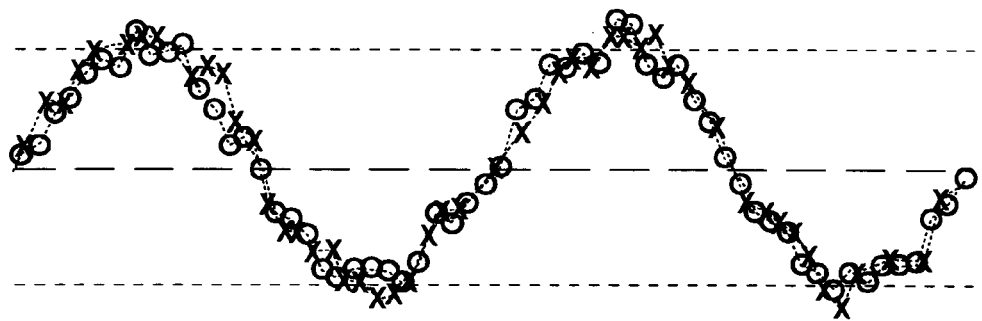
FIG. 4B shows an example of the trajectory of FIG. 4A with noise being present.

During test, in one preferred embodiment, the position of the head 4 is commanded to describe a periodic path over the surface of the disk 2. A sinusoidal head trajectory 11 is preferred for simplicity, though in principle any reasonable periodic path may be used. FIG. 4A show an idealised sinusoidal head trajectory. FIG. 4B shows a sinusoidal head trajectory with some noise present. The disk 2 has at least one track 6 that is circular and concentric with the disk 2. The centreline of the sinusoidal path is preferably coincident with the centreline of the track 6. The amplitude of the sinusoid is preferably such that the head 4 is caused to move back and forth across the entire radial extent of the track 6.

The wavelength of the sinusoid is preferably such that an integral number of complete wavelengths are precisely coincident with a complete revolution of the disk 2. Alternatively, a wavelength may be used where an integral number n of wavelengths is coincident with an integral number m of complete revolutions of the disk 2. It will be understood that the key consideration here is that the head, after some number of revolutions of the disk 2 (preferably just one revolution), returns to following the same path relative to the surface of the disk 2, such that a repeat reading can be taken of the data under the head 4.

Other periodic paths other than sinusoidal paths are contemplated as long as they are periodically applied to the head 4 and move the head 4 continuously over at least a portion of the radial extent of the track 6 and position the head 4 back where it started radially before starting the next period.

It is necessary that the particular coincidence between the wavelength of the commanded head position signal and the number of complete revolutions of the disk 2 is achieved with a high level of precision. In order to achieve the precise coincidence of the wavelength of the sinusoid and revolution of disk 2, an optical clocking technique may be used. An example of this is disclosed in our commonly assigned U.S. patent application No. 60/695,845 entitled "METHODS AND APPARATUS FOR GENERATING A CLOCK SIGNAL, FOR WRITING SERVO TRACKS, AND FOR CHARACTERISING TIMING ERRORS IN A SERVO TRACK WRITER" filed on Jul. 5, 2005 and WO-A-2007/0008643, the entire contents of which are hereby incorporated by reference. Briefly, movement of at least one mark that moves synchronously with the disk is detected by an optical detector to provide an output signal that can be processed to provide a clock signal. The mark or marks may be provided by a grating fixed to the disk 2, or some part that rotates synchronously with disk 2, such as the motor spindle 3 or some part of the motor itself.

Using the preferred sinusoidal head trajectory, the head 4 is made to measure test data across the full extent of the track 6. In prior art arrangements this had to be done by commanding the head 4 to a desired radial offset in relation to the track 6, and making measurements over several revolutions of the disk 2 at this offset; the offset would then be changed and the process repeated until the desired profile was built up across the radial extent of the track 6. By using the sinusoidal commanded head position of the present example, in principle, only one revolution of the disk 2 is required to acquire the necessary data across the width of the track 6. However, in practice it is preferred to use several revolutions of the disk 2 so that a greater number of readings can be taken for noise rejection purposes.

Feedback/feedforward may provided to the hybrid servo controller 8 from any number of the sources described in the following description and as illustrated by FIG. 2 and in more detail by FIG. 3. Preferably however feedback/feedforward from all the described sources is employed.

The nanopositioner 7 has an internal sensor 12 that produces a highly accurate signal 13 measuring the actual position achieved by the nanopositioner 7. The internal sensor 12 may be a precision capacitive probe or some other sensor, which may for example use optical gauges or laser interferometry. The actual position 13 measured by the sensor 12 is normally accurate to within a nanometre scale or less. The sensor position signal 13 is negatively fed back to the controller 8, generating a positioner error signal 15 which is provided as an error signal to the servo controller 8. Thus the sensor position signal 13 is used as the master signal for controlling the position of the head 4, utilising the accuracy of the sensor 12. The sensor position signal 13 is preferably limited to a particular range of frequencies by passing the sensor position signal 13 through a low pass filter 14 before it is fed back (as will be described further below).

This positioner error signal 15 has the advantage that it is highly accurate and does not depend for its accuracy on the head 4 being calibrated to the track 6 whenever a new head 4 mounted in the test apparatus 1. This signal allows the servo controller 8 and compensator 16 to position the nanopositioner 7 to accurately follow the command signal, whether this is an absolute position, a step move or a trajectory such as the sinusoidal signal described above. However, this positioner error signal 15 does not take into account any thermal drift or other noise that causes the nanopositioner 7 (and hence the head 4) to move relative to the disk 2.

The read/write head 4 detects servo information as it flies over the servo sectors of the disk 2. This information is passed through a pre-amplifier 17 via channel 18 to a demodulator circuit 19 (as shown in FIG. 2). The demodulator 19 demodulates the signal detected from the servo bursts to produce a demodulated position error signal (PES) 20. The PES 20 is a measure of the position of the head 4 from the track centreline (TCL). As will be described, error derived from the PES 20 is utilised by the hybrid servo controller 8 in two ways.

A high frequency signal 22 is derived from the PES 20 for use in rejecting high frequency disturbances, such as vibrational modes of the disk or spindle. The PES 20 is limited to a particular frequency range by band pass or high pass filtering the PES signal 20 with a band pass or high pass filter 21, or by using any other suitable spectral selection technique. Preferably, at least the DC and low frequency components of the PES 20 are removed by filtering, and more preferably, the frequency range passed by the filter corresponds to the high frequency asynchronous modes of the spindle 3 and disk 2. It is expected that a low frequency cut-off of at least 200 Hz for the filter 21 will be suitable in most cases. The high frequency PES 22 is fed back to the servo controller 8. This gives good noise rejection to these sources of error. At the same time, it is not necessary to characterise each head 4 under test to the track 6 before testing in order to utilise the PES 20 in this way.

Thus, two error terms 15,22, namely the positioner error 15 and the high frequency PES 22, are provided to the servo controller 8. The servo controller 8 has a compensator block 16 which implements the control law of the controller 8. The control law may be designed by any technique common in the art to provide an actuating signal 9 to the nanopositioner 7 to reduce or eliminate the position errors and to move the head 4 to follow the commanded input 10. For example, the compensator 16 may implement a simple PID control law or any other suitable control law, such as are well known in the art and will not be discussed in detail herein.

As described above, it is preferred that the sensor signal 13 is low pass filtered before being fed back to the controller 8. It is preferred that the low pass filter 14 that operates on the sensor signal 13 and the high pass/band pass filter 21 that operates on the PES 20 are such that there is substantially no overlap in frequency ranges between the filtered sensor signal 13 and the high frequency PES 22. This helps prevents conflict in the controller 8. This problem arises where error terms from two sources are enclosed in a feedback loop; in this case, an error term 13 derived from the position measured by the internal sensor 12 of the nanopositioner 7 and an error term derived from the PES 20 measured by the head 4. The controller 8 will try to reduce both of these error signals to zero by manipulating a single variable, i.e. by controlling the position of the nanopositioner 7. However, under certain conditions there will be a conflict in trying to reduce both error terms to zero, causing the servo controller to "fight" itself. By filtering the two fed-back error signals 15,22 to non-overlapping frequency ranges, this problem is eliminated or substantially reduced.

Figure 4C:
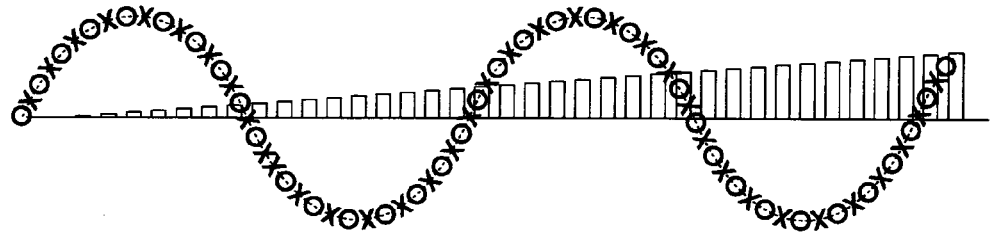
FIG. 4C shows an example of the trajectory of FIG. 4A with thermal drift being present.

Changes of ambient temperature are often encountered during testing of the head 4. This will cause expansion or contraction of the various different elements of the test apparatus 1. This expansion/contraction will typically occur at different rates for the different elements depending on the thermal expansion coefficients of the various parts. Moreover the different parts will conduct and store heat at different rates, also leading to variation in the degree of expansion/contraction of the parts. Furthermore the different parts, including the disk 2, will have different proximities to the various sources of heat in the apparatus. FIG. 4C shows an example of how the commanded sinusoidal position of the head 4 can drift off-track due to thermal drift effects (shown in exaggerated form).

Figure 3:
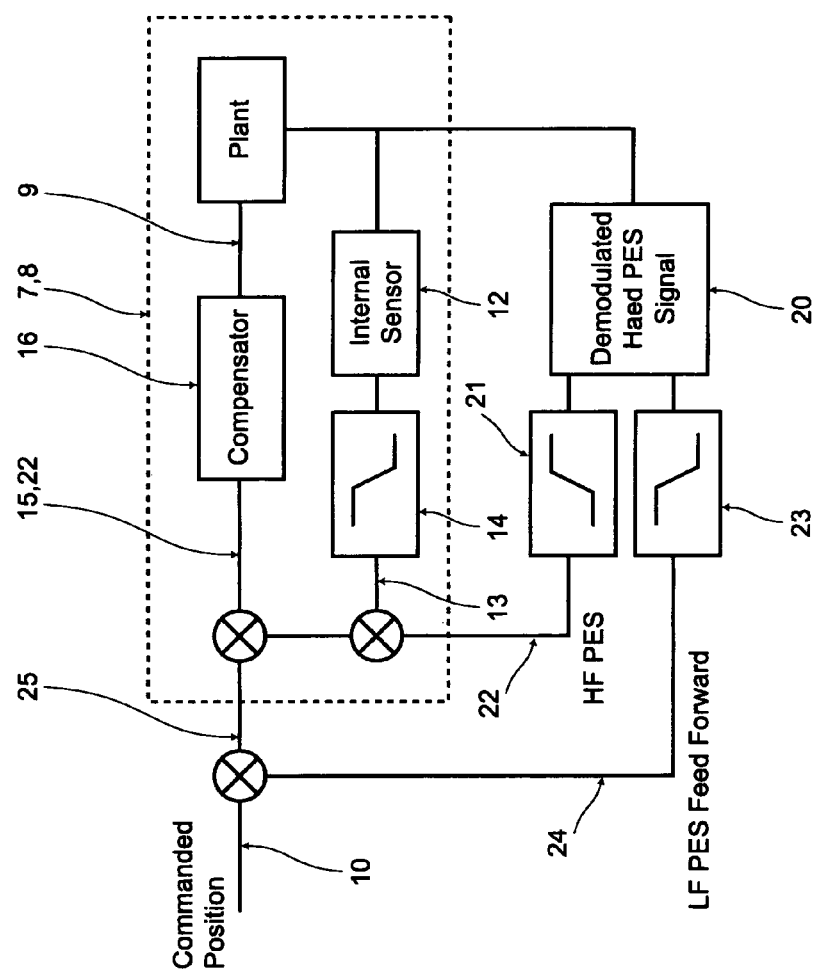
FIG. 3 shows schematically a detailed view of the nanopositioner and hybrid servo controller of the apparatus of FIG. 2.

A low frequency signal 24 is obtained from the PES signal 20 corresponding to any thermal drift experienced by the head 4 for use in compensating for thermal drift error (this process being shown generally by the block labelled 23 in FIG. 3). The low frequency PES signal 24 is derived from the PES 20 such that it provides a measure of the thermal drift without being dependent on the commanded position 10 of the head, i.e. the low frequency PES signal 24 should not change when the head 4 is commanded to a new position. Also preferably, the low frequency PES 24 is obtained so that it measures thermal drift without having to calibrate to the servo bursts.

In the preferred scheme, where the commanded input 10 is a sinusoid 11, the PES 20 is sampled when the commanded position 10 of the head 4 coincides with the track centreline (i.e. when the sinusoid or other periodic signal is at a multiple of n radian intervals). These samples are collected over a number of revolutions of the disk 2 and averaged or low pass filtered. The values obtained give a very low bandwidth measure of error caused by thermal drift (or predominantly by thermal drift). In a non-drifting situation, these values should be zero.

This technique has the advantage of being simple to implement. Also, the PES samples 20 are obtained at the track centreline, coinciding with the positions of the servo nulls of the servo bursts and thus the effects of possible non-linearity and variation in gain of the PES signal 20 are largely obviated. It is therefore not necessary to characterise the head 4 to the track 6 to attain an accurate measure of the thermal drift of the head 4. Drift can be detected and eliminated in real-time, enabling a greater proportion of test time to be spent acquiring test data rather than calibrating the head 4 to the track 6. The time taken to test the head 4 is therefore reduced leading to more efficient, cost-effective testing.

More generally, the low frequency PES 24 corresponding to the thermal drift may be derived by any other technique as disclosed in our commonly assigned U.S. patent application No. 60/771,879 entitled "METHOD OF GENERATING A POSITION ERROR SIGNAL, METHOD OF WRITING A DATA TRACK, AND APPARATUS FOR TESTING A HEAD AND A DISK" filed on Feb. 10, 2006, the entire content of which is hereby incorporated by reference. These techniques of deriving a thermal drift error term from the PES 20 have the advantage over standard techniques, for example compared to the techniques of U.S. Pat. No. 6,023,145 and U.S. Pat. No. 6,538,838, that it is not necessary to compensate for the non-linearity of the PES 20 by calibrating the head 4 to the track 6 during testing.

Figure 6:
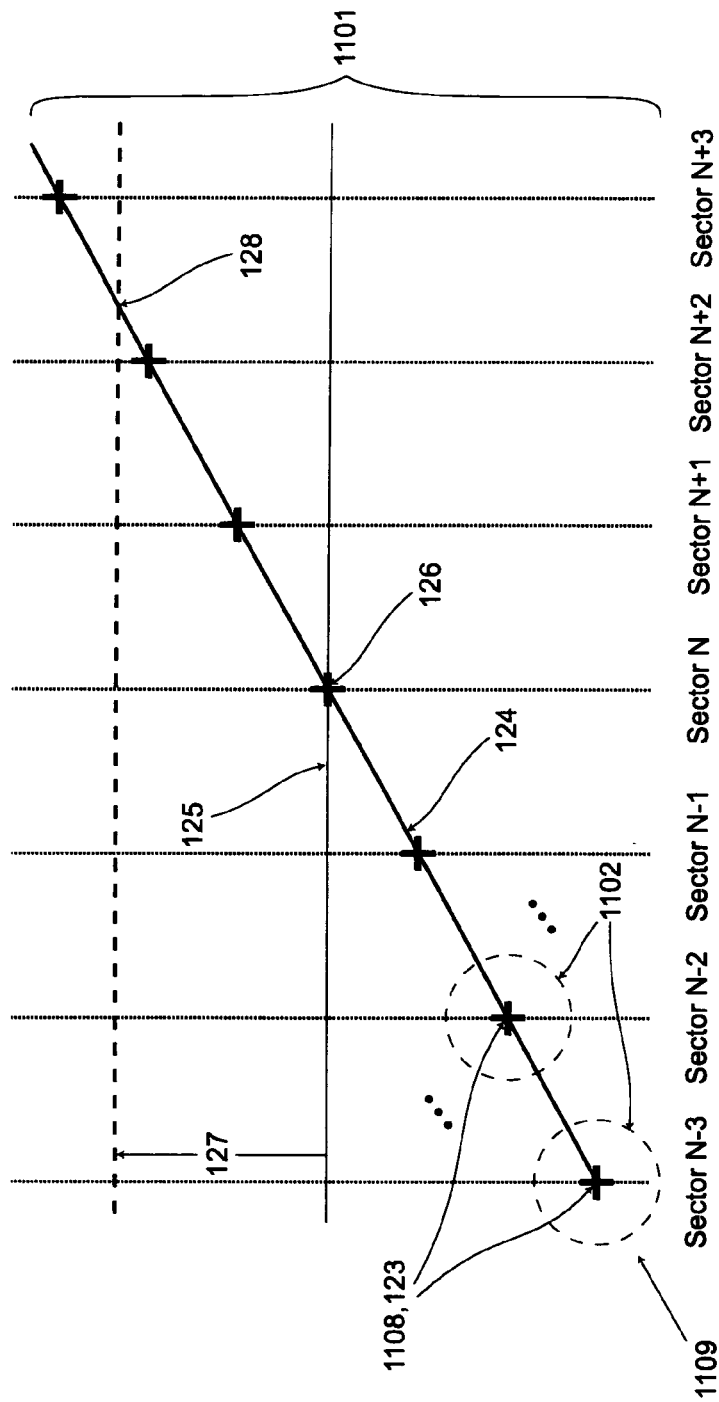
FIG. 6 shows an example of a layout of the servo nulls of a servo track.

For example, FIG. 6 shows (not to scale) a test track/data track 101 having a preferred layout of servo bursts 1102 (shown schematically) in the form of a sectored servo track 1109. The servo bursts 1102 are shown over a segment of the complete test track 1101, from sector n−3 to sector n+3. The track 1101 is circular and concentric with the disk 2. (It should be noted that the circular track has been projected onto a linear axis in FIG. 3 to illustrate more clearly the properties of the servo track.)

In use, data is written to and read from the track 1101 on the disk 2 interleaved with the sectored servo track 1109. The servo bursts 1102 of each servo sector provide servo nulls 1108. The preferred servo bursts 1102 are QAM (quadrature amplitude modulated) servo bursts, such that each servo null 1108 is provided by a pair of associated servo bursts 1102. However other suitable types of servo bursts 1102 known in the art for providing servo nulls may be used. For reasons of clarity, FIG. 6 does not show the form of the servo bursts 1102 themselves. Instead, FIG. 6 shows the location of the servo nulls 1108 provided by the various servo bursts 1102 in relation to the track 1101.

In a preferred embodiment, the radial positions 123 of the servo nulls 1108 vary linearly with the circumferential positions of the servo nulls 1102. FIG. 6 shows the linear relationship or locus 124 of the positions of the servo nulls 1108. As will be readily appreciated, where a sectored servo scheme is employed, the radial positions 123 of the servo nulls 1108 lie on and define the locus 124 but will do so having discrete positions. Hence FIG. 6 shows the locus 124 of the discrete servo null positions 123. It is preferred that the servo nulls 1108 are evenly radially spaced. It is also preferred that the servo nulls 1108 are evenly circumferentially spaced. In an example, if it is assumed that a typical number of servo sectors is 250 and that the servo sectors take up half of the track 1101, then each sector is equivalent to 0.2% of the circumference of the track 1101.

Other relationships between the radial positions and circumferential positions of the servo nulls 1108 other than linear are contemplated. In any case, preferably the radial position of successive servo nulls 1108 varies monotonically with circumferential position. Preferably the form of the locus 124 is predetermined and known to the system beforehand.

FIG. 6 shows that for the current position of the head 4 a null 126 occurs on sector N for a concentric read position 125. As the head 4 flies circumferentially over the track 1101 it detects each servo burst 1102 in turn. The detected signal from the servo bursts 1102 is demodulated to provide a servo sample for each servo burst 1102, measuring the radial position of the servo null 1108 of the servo burst 1102 relative to the head 4.

The signal from this servo burst 1102 is used to generate the error signal to correct for any thermal drift or other error. To reduce the noise in this signal, the bursts either side of the target may be read and if necessary averaged or interpolated using the known relationship of the locus 124 to determine a more accurate null position. Non-linearity error and gain error of the signal read from the servo burst are reduced near this null position.

Referring again to FIG. 6, if it is now desired to microjog the head 4 0.5% of the track width to a new radial position 127 then the following steps are taken. First, a new target null position 128 is calculated for the desired radial position 127 of the head 4 by using the known relationship of the locus 124. In this example the target null position 128 lies midway between sectors N+2 and N+3. The head 4 is then commanded to the approximate target position 127 using the nanopositioner 7 and its internal sensor 12. The servo nulls 1108 are read by the head 4. Either all servo nulls 1108 can be read or only those near the target radial position 127 can be read. Interpolation is used in the detected null signals in accordance with the known relationship of the locus 124 to find the actual null position 28 where the head crosses the locus 124. The difference in the position of the target null position 128 and the detected null position is used to generate the position error signal 20.

As will be appreciated, this method of calculating the target null position 128 for the desired radial offset of the head 4 before the head 4 is moved and then generating a position error signal 20 relative to this target null position 128 results in a position error signal 20 that will always be zero when the head is at the target position 127. This is true at whichever target position 127 is selected relative to the track 1101, i.e. whatever the commanded position of the head. This technique may be used for small microjogs across the track 1101 or scaled to moves of several tracks 1101. This technique may be used to generate a PES for any desired radial position of the head 4 relative to the track 1101, so long as the locus 124 extends radially to the same extent as the track 1101. Radial positions beyond the track 1101 can similarly be used as long as the locus 124 extends this far.

In another embodiment the target position 127 can be selected to coincide with whichever is the nearest servo null 1108 at that radial position. In this case, the resolution in the positioning of the head 4 is limited by the number of servo nulls 1108 on the locus 124.

Figure 7:
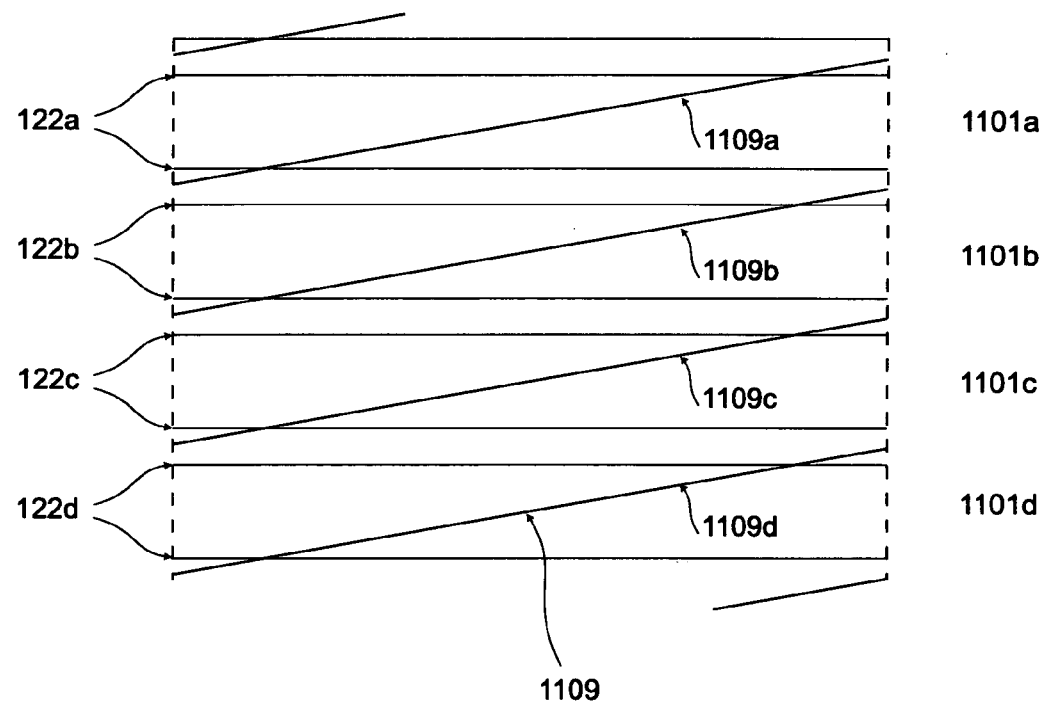
FIG. 7 shows an example of a spiral servo track.

Preferably the servo nulls 1108 extend at least across the entire radial extent of the test track 1101. The servo nulls 1108 may extend beyond the radial extent of the track 101. Indeed, the servo track 1109 may extend beyond the test track 101 shown in FIG. 6 to other, radially adjacent tracks 1101 on the disk 2, with the servo nulls 1108 continuing their locus 124. In this way, as shown schematically in FIG. 7, a single continuous servo track 1109 may be written to the disk 2 in the form of a spiral. Segments of this spiral servo track 1109 provide in effect a respective servo track 1109a,1109b,1109c,1109d to a plurality of adjacent concentric circular data tracks 1101a, 1101b,1101c,1101d (as shown in FIG. 7 by track edges 122a, 122b,122c,122d) on the disk 2.

It is preferred that the servo bursts 1102 are written with the same nanopositioner 7 that is used when positioning the head 4 by micro-jogging during testing of the head 4. This allows the writing and reading of the servo bursts 1102 to be coordinated so that any inaccuracies in the nanopositioner 7 effectively cancel out. This is generally in accordance with the standard method of writing servo tracks 1109 in a production testing environment, where a series of tracks 1109 is written as part of an initialisation routine and remain for several hundred or thousands of heads 4 before repeating the process.

It is preferred that repeatable errors, either written-in RRO (repeatable run out) or mechanically induced NRRO (non-repeatable run out), are compensated for dynamically in order to achieve higher accuracy in positioning the head 4 and thus testing the head 4. The RRO may be characterised at initialisation of the test apparatus 1, in accordance with known techniques in the art. The mechanical error is preferably dynamically compensated for. Preferably an algorithm interpolates each measurement on a sector-to-sector basis, based on reading PES 20 independent of radial position. Preferably the system is arranged so that at least 20 revolutions of the disk are used to accumulate enough RRO data to prime the system before the servo controller 8 is engaged on the PES 20 to compensate for thermal drift. It is envisaged that this will take no more than 100 ms. This could be done in parallel with the test operation or alternatively run as a stand alone operation if the overhead is acceptable for the application.

Figure 8:
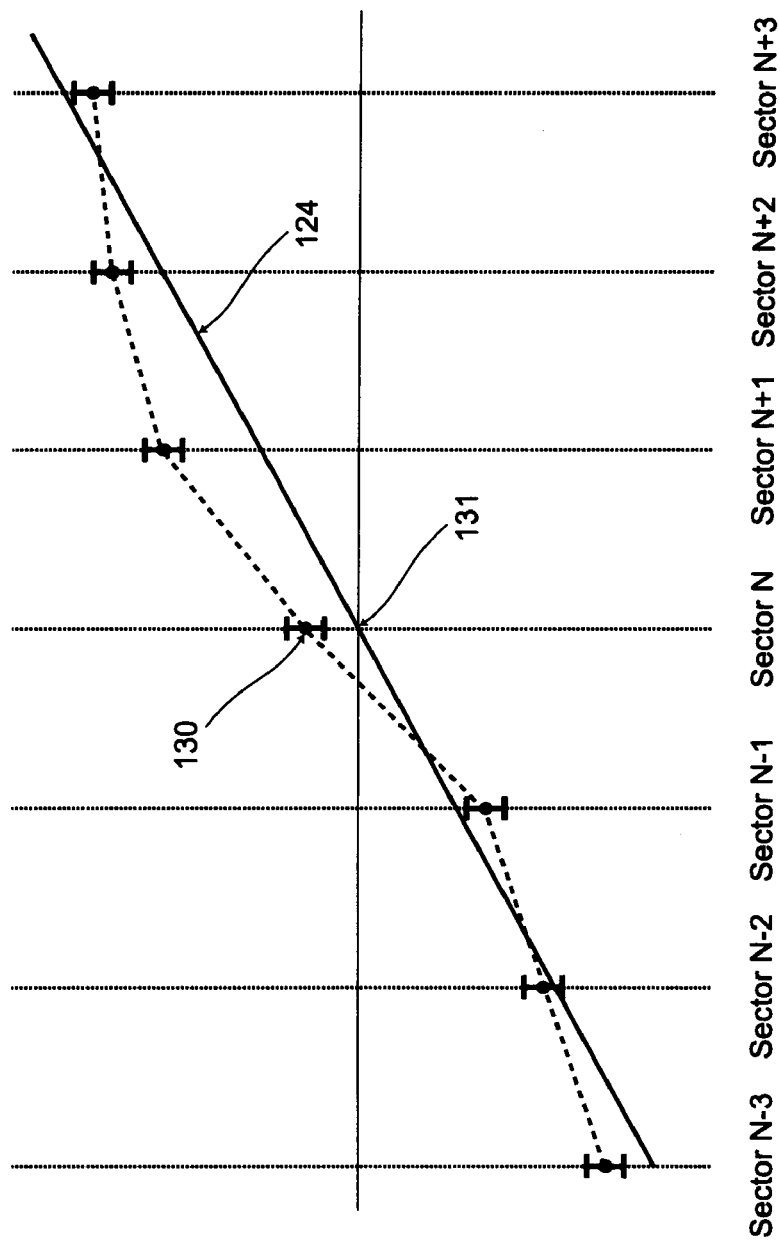
FIG. 8 shows an example of RRO and NRRO error in reading the servo track of FIG. 6.

Referring to FIG. 8, the locus 124 of ideal nulls 131 and an actual set of detected servo nulls 130 is shown. For the detected servo nulls 130, the points show the RRO component of the error (for example caused by eccentricity in the spindle) and the error bars show the NRRO component of the error (for example caused by mechanical vibration). To determine the RRO component, detected samples 130 need to be averaged over multiple revolutions of the disk in order to reject the NRRO component. The error between each sample 130 and the ideal null 131 is characterised and kept in a dynamic RRO table, which is used to determine the position of the servo nulls 1108. The repeatable component is constant for each servo burst and can therefore be used when micro-jogging across tracks 1101 without the need to update the table.

Other arrangements of the servo bursts 1102 and the track 1101 are envisaged as alternatives to the specific embodiment described above having a circular concentric data track 1101 and a linear/spiral locus 124 of servo nulls 1108. For example, a null locus 124 in the form of a sine wave may be used with a circular, concentric data track 101 instead of the linear/spiral form of locus 124.

Alternatively, it is not necessary to write a circular, concentric data track 1101. As described above, the data track 1101 could be written in the form of a spiral or sine wave, and the locus of servo nulls 1108 could be concentric. Other forms are possible. In each case, the locus of servo nulls 1108 extends across the radial extent of the track 1101. Here, radial extent of the track 1101 means relative to the track 101 rather than relative to the disk 2. This allows for a point to be found on the locus 124 where the head will cross the locus 24 and detect a servo null 1108 when following the track 1101 at that position at all radial positions on the track 1101.

It is also envisaged that the locus 124 may extend over a number of adjacent data tracks 1101, or over only a part of a data track 1101, depending on the area of the disk 2 of interest according to the particular test being performed.

Which ever way the low frequency PES error term 24 is derived, it is preferred that it is limited to an upper frequency of no more than 10 Hz. This is consistent with the expected typical rates of thermal drift that may be experienced by such test apparatus. A low pass filter may be employed to limit the upper frequency of the signal. Finally, the low frequency PES term is integrated by an integrator. This provides an error term 24 that measures the drift of the head 4. This error term 24 fed forward to the controller 8 by summing the term 24 with the commanded input signal 10 to create a compensated commanded position 25. This compensated commanded position 25 is the commanded position fed to the nanopositioner control loop, and is used as the reference point for the control. This feedforward technique avoids potential conflict in the servo controller 8 between the low frequency PES 24 and the other error signals.

The preferred embodiment also aims to reduce "repeatable run out error" or RRO. RRO may be caused by, for example, the tracks defined by the servo data departing from the circular ideal when the servo data is initially recorded (so-called "written-in" error). As shown in FIGS. 4A and 4B, this manifests itself as servo bursts being slightly offset radially from their idealised position. This may be caused for example by slight eccentricities in the spindle.

To compensate for written-in error, the inverse repeatable run-out 26 of a pre-characterised track may be summed with the sinusoid signal 11 before being fed to the hybrid servo controller 8 as the commanded input signal 10 (as shown in FIG. 2). This removes a proportion of error that has been written into the servo track itself.

Figure 5A:
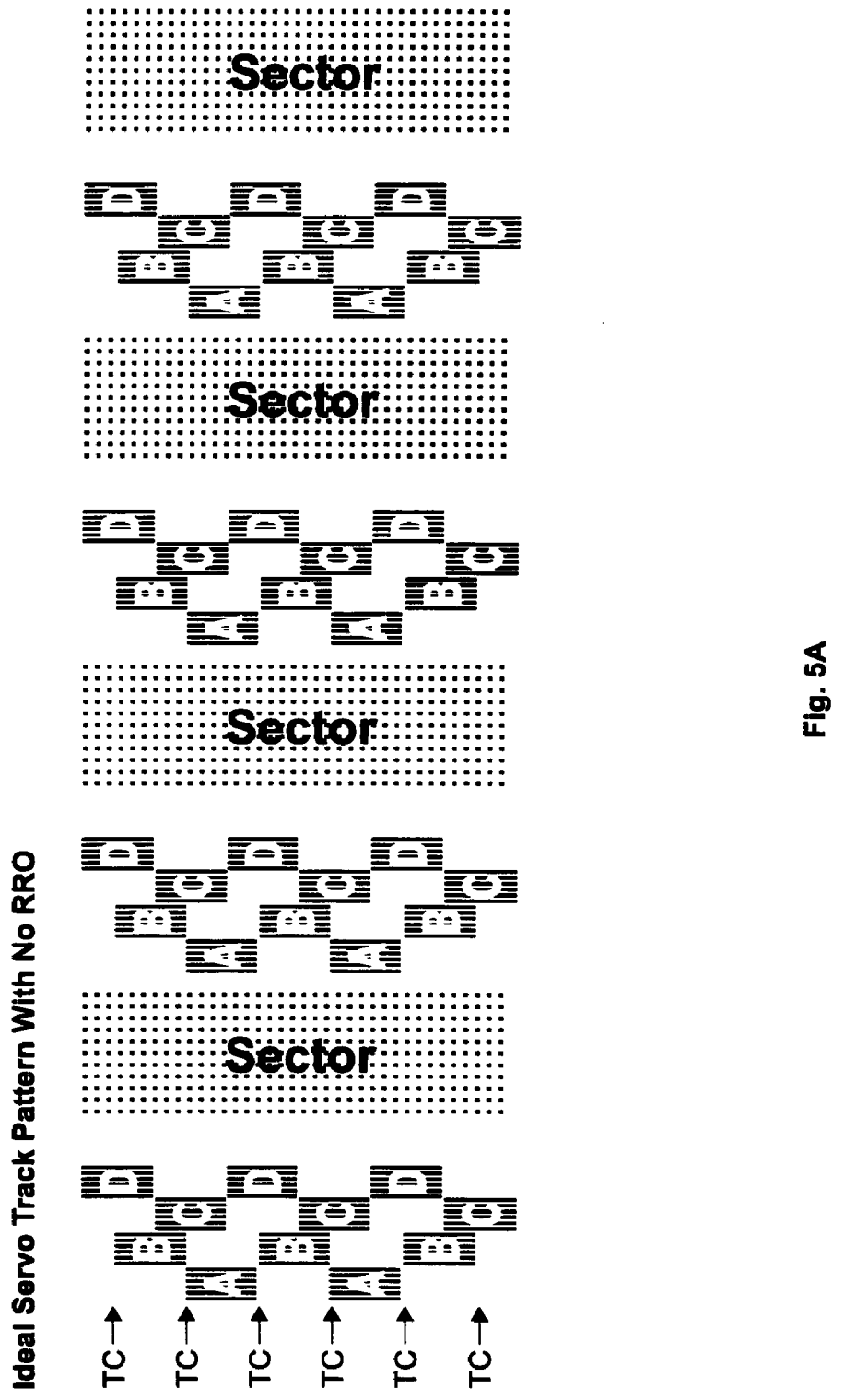
FIG. 5A shows an example of an idealised servo track pattern with no RRO.
Figure 5B:
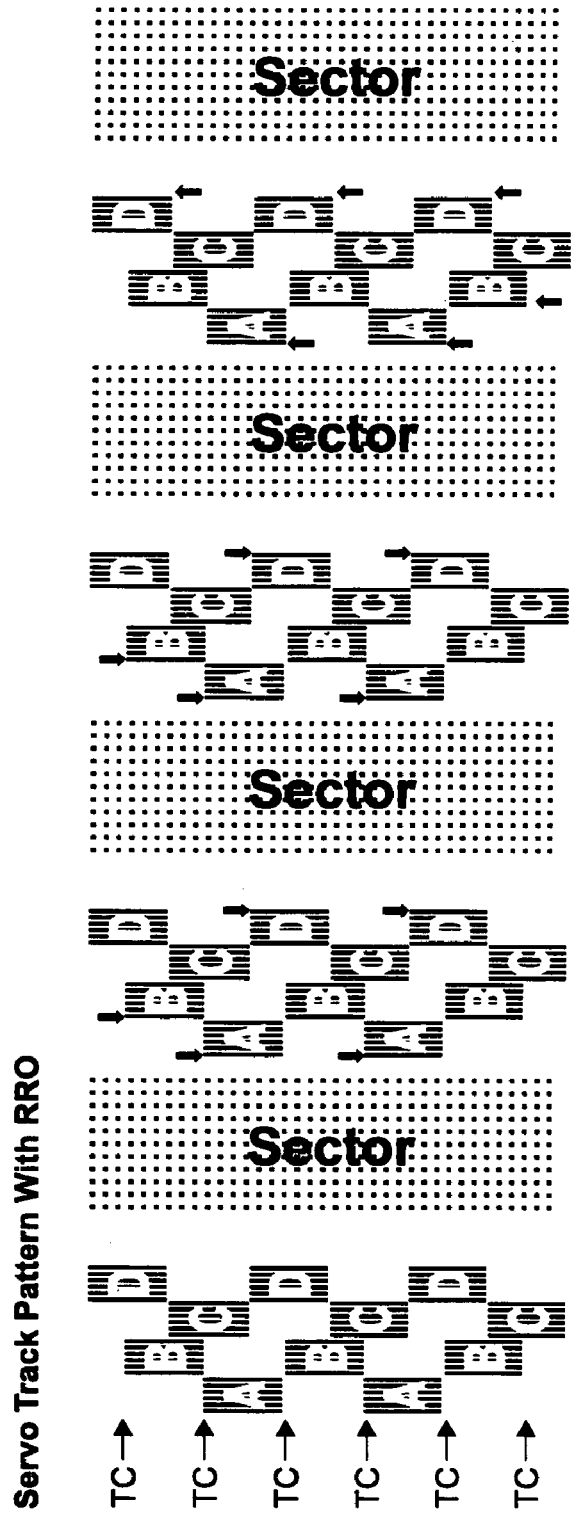
FIG. 5B shows an example of a servo track pattern with RRO.
Figure 5C:
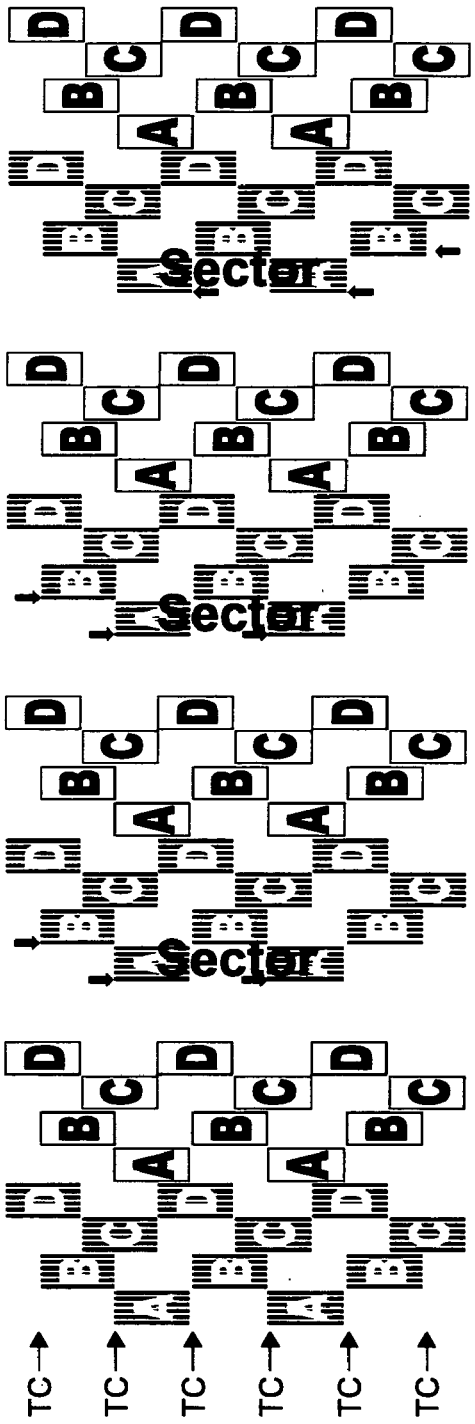
FIG. 5C shows an example of a compensated "gold-standard" servo track in accordance with an embodiment of the present invention.

Alternatively or additionally to this, a multi write process can be used to obtain a "gold standard" low RRO servo track as shown in FIG. 5C. It is preferred that the gold track is written to the disk as a first step when the new disk is loaded onto the test apparatus. The gold track is then used by all heads undergoing test until it is required to change the disk.

The head under test 4 may optionally be calibrated to the servo tracks on the disk 2 before test. However, it is preferred that the read/write head under test 4 is not so calibrated as a calibration step will take a significant amount of time and thus make the overall test process more time consuming and expensive. The effect of not calibrating each head 4 is that there is likely to be some degree of non-linearity in the relationship between the PES 20 and the actual radial offset of the head 4 from the track centreline. This non-linearity leads to an undesired gain term in the closed loop system of the hybrid servo controller 8. It is contemplated that implementation of a lower bandwidth servo and consideration to this gain term for a typical head should result in a stable control system, whilst still delivering position accuracies for the head 4 that are consistent with the demands of the very high TPI of modern disk drive units.

Embodiments of the present invention have been described with particular reference to the example illustrated. However, it will be appreciated that variations and modifications may be made to the examples described within the scope of the present invention.

For example, examples of preferred embodiments of the present invention have been described with reference to performing BER bathtub tests on the read/write head of a magnetic disk. However, as the skilled person will readily appreciate, other types of head test could be performed in accordance with principles of the present invention. Similarly other types of head for reading other types of media could be tested in accordance with the principles the present invention.

The invention claimed is:

1. A method of controlling the position of a read/write head relative to a disk in a test apparatus, the test apparatus having a positioner for positioning the head, the positioner having a sensor for measuring the actual position achieved by the positioner, the method comprising:
   generating a sensor signal measuring the actual position achieved by the positioner;
   generating a position error signal of the head relative to the disk detected at the head;
   high pass filtering the head position error signal and low pass filtering the sensor signal so that there is substantially no overlap in frequency between them;
   deriving a low frequency head error signal from the head position error signal corresponding to any drift of the head;
   feeding forward the low frequency head error signal to generate a compensated commanded position of the head;
   generating a position error signal of the positioner in accordance with the compensated commanded position of the head and the filtered sensor signal;
   providing both said positioner error signal and said high frequency head error signal to a hybrid servo controller; and,
   controlling the position of the head by causing said hybrid servo controller to signal said positioner with a movement control signal generated in accordance with both of said provided error signals used simultaneously.

2. A method according to claim 1, wherein high pass filtering the head position error signal comprises passing frequency components corresponding to vibration modes of at least one of the disk, or a spindle to which the disk is attached, or other apparatus used to carry out the method.

3. A method according to claim 1, wherein the disk has at least one track associated therewith having a plurality of servo bursts defining a plurality of servo nulls for the track, the servo nulls being positioned such that there are servo nulls at more than four different radial positions relative to the track, the servo nulls defining a predetermined locus having a known position relationship with the track, the locus extending across the radial extent of the track, the method comprising:
   (a) determining a target null position on the null locus corresponding to said desired radial position of the head relative to the track in accordance with said known position relationship;
   (b) detecting the position of at least one servo null with the head;
   (c) determining from said at least one detected servo null position the position error of the head relative to the target null position; and,
   (d) generating a position error signal for the head in accordance with said position error.

4. A method according to claim 1, comprising commanding the position of the head with a periodic movement signal such that the radial position of the head moves notionally along a periodic path, the head traversing n wavelengths of the periodic path as a said disk rotates m revolutions, where n and m are integers.

5. A method according to claim 4, wherein the commanded periodic path is substantially a sinusoidal path.

6. A method according to claim 4, the disk having at least one track having servo bursts associated therewith from which the head error position signal is generated, the step of deriving a low frequency head error signal from the head position error signal comprising:

sampling the head position error signal at positions of said periodic movement signal that correspond to the track centre points; and, determining the trend in the samples over a plurality of samples to find a drift error term for the head.

7. A method according to claim 1, wherein the step of deriving a low frequency head error signal from the head position error signal comprises low pass filtering the head position error signal.

8. A method according to claim 1, wherein the low frequency head error signal is derived such that it has an upper frequency of less than 10 Hz.

9. An apparatus for testing a read/write head, the apparatus comprising:
- a positioner for positioning a read/write head over a radial position on a disk and having a sensor for measuring the actual position achieved by the positioner;
- a demodulator for demodulating servo bursts read by the head to produce a head position error signal;
- a low pass filter for filtering the sensor signal and a high pass filter for filtering the head position error signal such that there is substantially no overlap in frequency between the filtered signals;
- a head error signal filter for deriving a low frequency head error signal from the head position error signal corresponding to any drift of the head;
- a first summing node for receiving a commanded head position input signal and the low frequency head error signal to generate a compensated commanded position of the head;
- a second summing node for generating a position error signal of the positioner in accordance with the compensated commanded position of the head and the filtered sensor signal; and,
- a hybrid servo controller constructed and arranged to control the position of the head with the positioner in accordance with both received error signals used simultaneously.

10. An apparatus according to claim 9, wherein said high pass filter is arranged to pass frequency components corresponding to vibration modes of at least one of a said disk, a spindle, or other parts of the test apparatus.

11. An apparatus according to claim 9 in combination with a disk having a track, wherein the track has a plurality of servo bursts defining a plurality of servo nulls for the track, the servo nulls being positioned such that there are servo nulls at more than four different radial positions relative to the track, the servo nulls defining a predetermined locus having a known position relationship with the track, the locus extending across the radial extent of the track, the demodulator comprising:
- a processor arranged to:
    - (a) receive a desired radial head position relative to the track;
    - (b) determine a target null position on the null locus corresponding to said desired radial position of the head relative to the track in accordance with said known position relationship;
    - (c) detect the position of at least one servo null with the head;
    - (d) determine from at least one detected servo null position the position error of the head relative to the target null position; and,
    - (e) generate a position error signal in accordance with the position error.

12. An apparatus according to claim 9, comprising a test controller for commanding the position of the head with a periodic movement signal such that the radial position of the head moves notionally along a periodic path and traverses n wavelengths of the periodic path as a said disk rotates m revolutions, where n and m are integers.

13. An apparatus according to claim 12, wherein the commanded periodic path is substantially a sinusoidal path.

14. An apparatus according, to claim 12, wherein the head error signal filter is constructed and arranged to sample the head position error signal at positions of said periodic movement signal that correspond to the desired track centre points and to determine the trend in the samples over a plurality of samples to find a drift error term for the head.

15. An apparatus according to claim 9, wherein the head error signal filter comprises a low pass filter.

16. An apparatus according to claim 9, wherein the head error signal filter is arranged such that the low frequency head error signal has an upper frequency of less than 10 Hz.

* * * * *